US012577430B2

(12) United States Patent
Lin

(10) Patent No.: US 12,577,430 B2
(45) Date of Patent: Mar. 17, 2026

(54) POLISHING COMPOSITION CONTAINING ZIRCONIA PARTICLES AND AN OXIDIZER

(71) Applicant: Fujimi Incorporated, Kiyosu (JP)

(72) Inventor: Jie Lin, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 652 days.

(21) Appl. No.: 17/802,773

(22) PCT Filed: Feb. 25, 2021

(86) PCT No.: PCT/JP2021/007094
§ 371 (c)(1),
(2) Date: Aug. 26, 2022

(87) PCT Pub. No.: WO2021/172427
PCT Pub. Date: Sep. 2, 2021

(65) Prior Publication Data
US 2023/0081442 A1 Mar. 16, 2023

Related U.S. Application Data

(63) Continuation-in-part of application No. 17/100,072, filed on Nov. 20, 2020, now abandoned, and a continuation-in-part of application No. 16/805,037, filed on Feb. 28, 2020, now abandoned.

(51) Int. Cl.
*C09G 1/02* (2006.01)
*C01G 25/02* (2006.01)

(52) U.S. Cl.
CPC ............... *C09G 1/02* (2013.01); *C01G 25/02* (2013.01); *C01P 2004/64* (2013.01)

(58) Field of Classification Search
CPC ................................. C09G 1/02; C09G 25/02
See application file for complete search history.

(56) References Cited

U.S. PATENT DOCUMENTS

| | | | |
|---|---|---|---|
| 5,958,288 | A | 9/1999 | Mueller et al. |
| 6,673,684 | B1 | 1/2004 | Huang et al. |
| 7,364,600 | B2 | 4/2008 | Kim et al. |
| 8,778,212 | B2 | 7/2014 | Jin et al. |
| 9,410,063 | B2 | 8/2016 | Haerle et al. |
| 10,227,517 | B2 | 3/2019 | Takahashi et al. |
| 2002/0194789 | A1 | 12/2002 | Oshima |
| 2003/0139069 | A1 | 7/2003 | Block et al. |
| 2003/0172594 | A1 | 9/2003 | Castro et al. |
| 2008/0153292 | A1 | 6/2008 | White et al. |
| 2009/0004863 | A1 | 1/2009 | Kamimura |
| 2012/0171936 | A1 | 7/2012 | Haerle et al. |
| 2014/0209566 | A1* | 7/2014 | Fu .................... C09G 1/02 252/79.1 |
| 2015/0021513 | A1 | 1/2015 | Kim et al. |
| 2015/0027981 | A1 | 1/2015 | Singh et al. |
| 2015/0084065 | A1 | 3/2015 | Koike et al. |
| 2018/0179417 | A1 | 6/2018 | Mizutani et al. |

FOREIGN PATENT DOCUMENTS

| | | |
|---|---|---|
| CN | 1384170 A | 12/2002 |
| CN | 101333417 A | 12/2008 |
| JP | 2014-024154 A | 2/2014 |
| JP | 2015-021132 A | 2/2015 |
| WO | WO-03/050859 A1 | 6/2003 |
| WO | WO-2005007770 A1 * | 1/2005 ............... C09G 1/02 |
| WO | WO-2016/203586 A1 | 12/2016 |

OTHER PUBLICATIONS

Taiwanese Office Action for TW Appl. Ser. No. 110106943 dated Apr. 15, 2024 (21 pages).
Notice of Reasons for Refusal issued in corresponding Japanese Application No. 2022-503689 Dated Jan. 21, 2025 (11 pages).
D.S. Hwang, et al., "New etching process for device fabrication using diamond", Diamond and Related Materials, vol. 13 Issues 11-12, 2004, 2207-2210.
Evan L.H. Thomas, et al., "Chemical mechanical polishing of thin film diamond", Carbon 68, 2014, 473-479.
Franz Kreupl, et al., "Carbon-based resistive memory", Electron Devices Meeting, 2008. IEDM 2008. IEEE International, 15 pages.
H.Y. Tsai, et al., "Evaluation research of polishing methods for large area diamond films produced by chemical vapor deposition", Diamond and Related Materials, 16, 2007, 253-261.
International Search Report and Written Opinion from PCT Appl. Ser. No. PCT/JP2021/007094 mailed Mar. 30, 2021, with partial translation (12 pages).
Jessica M. Werrell, et al., "Effect of slurry composition on the chemical mechanical polishing of thin diamond films", Science and Technology of Advanced Materials, vol. 18, No. 1, 2017, 654-663.
Soumen Mandal, et al., "Redox agent enhanced chemical mechanical polishing of thin film diamond", Carbon, 130: 25-30 (2018).
Zewei Yuan, et al., "Chemical Mechanical Polishing Slurries for Chemically Vapor-Deposited Diamond Films", Journal of Manufacturing Science and Engineering, vol. 135(4): 041006, 2013, 8 pages.
KR Notice of Preliminary Rejection issued in corresponding KR Application No. 10-2022-7029041 Dated Aug. 18, 2025 (9 pages).

* cited by examiner

*Primary Examiner* — Pegah Parvini
(74) *Attorney, Agent, or Firm* — Foley & Lardner LLP

(57) ABSTRACT

Provided herein are CMP compositions, and methods for polishing surfaces comprising amorphous carbon, spin-on carbon (SoC), and/or diamond like carbon (DLC) films. The CMP compositions of the present disclosure contain at least one abrasive having zirconia particles and may also contain at least one metal-containing oxidizer.

19 Claims, No Drawings

POLISHING COMPOSITION CONTAINING ZIRCONIA PARTICLES AND AN OXIDIZER

CROSS-REFERENCE TO RELATED APPLICATION

This application incorporates the entire contents of U.S. patent application Ser. No. 16/805,037, filed on Feb. 28, 2020, and U.S. patent application Ser. No. 17/100,072, filed on Nov. 20, 2020, into the present specification by reference.

TECHNICAL FIELD

The present technology generally relates to chemical mechanical polishing compositions and methods for polishing surfaces comprising amorphous carbon, spin-on carbon (SoC), and/or diamond like carbon (DLC) films.

BACKGROUND

One of the major chemical mechanical polishing (CMP) challenges for semiconductor manufacturing is the selective polishing certain materials. Carbon and DLC films have been increasingly used in integrated circuit (IC) fabrication. U.S. Pat. No. 6,673,684; D. S. Hwang, et al., Diamond and Related Materials, 13(11-12): 2207 to 2210 (2004); Franz Kreupl, et al. Electron Devices Meeting, 2008. Conventional methods are not effective for the polishing of DLC films (H Y Tsai, et al., Diamond and Related Materials. 16(2)) and chemical enhancement including oxidation is adopted to improve removal rates therefor (Zewei Yuan, et al., J. Manuf. Sci. Eng. 135(4): 041006 (2013); Evan L., et al., Carbon 68: 473 to 479 (2014); Jessica M. Werrell, et al., J. Sci. Techn. Adv. Materials 18(1): 654 to 663; Soumen Mandal, et al., Carbon, 130: 25 to 30 (2018)). However, the removal rate is still too low for leading edge CMP.

Accordingly, a need exists for novel CMP compositions that can effectively and efficiently polish amorphous carbon, SoC, and/or DLC films.

SUMMARY OF THE DISCLOSURE

Provided herein are compositions and methods for polishing surfaces comprising amorphous carbon, SoC, and/or DLC films.

Embodiments include a method of increasing the removal rate of amorphous carbon, SoC, or DLC from a surface, comprising contacting the surface with a slurry comprising an abrasive having zirconia particles and a metal-containing oxidizer, and polishing the surface. In some embodiments, the removal rate is increased when compared to a removal rate using a similar slurry composition having silica and/or a non-metal-containing oxidizer in place of zirconia particles and/or the metal-containing oxidizer. In some embodiments, the zirconia particle is an aggregate comprising primary particles. In some embodiments, the zirconia particle comprises a primary particle size with a diameter of about 8 to 10 nm and a secondary particle size of the aggregates with a diameter of about 70 nm. In some embodiments, the metal-containing oxidizer comprises an element selected from the group consisting of manganese, cerium, vanadium, and iron. In some embodiments, the metal-containing oxidizer is selected from the group consisting of $KMnO_4$, $(NH_4)_2Ce(NO_3)_6$, $NaVO_3$, $NH_4VO_3$, and $Fe(NO_3)_3$. In some embodiments, the composition has a pH of about 3 to about 6. In some embodiments, the zirconia particles are present in an amount of about 0.01 wt. % or more or about 0.2 wt. % or more. In some embodiments, the zirconia particles are present in an amount of about 2.5 wt. % of less. In some embodiments, the metal-containing oxidizer present in an amount of about 0.05 mM or more or about 2 mM or more. In some embodiments, the zirconia particles comprise colloidal zirconia. In some embodiments, the zirconia particles comprise calcined zirconia. In some embodiments, the zirconia particles are doped with yttrium atoms as yttria. In some embodiments, a concentration of yttria in the zirconia particles is at least 9 mol %. In some embodiments, the zirconia particles doped with yttria have particle sizes of less than 80 nm. In some embodiments, a pH of a composition comprising the zirconia particles doped with yttria is about 2 to 6.

Other embodiments include a chemical mechanical polishing (CMP) composition comprising colloidal zirconia particles and a metal-containing oxidizer. In some embodiments, the colloidal zirconia particle is an aggregate comprising primary particles. In some embodiments, the colloidal zirconia particle comprises a primary particle size with a diameter of about 8 to about 10 nm and a secondary size of the aggregates with a diameter of about 70 nm. In some embodiments, the metal-containing oxidizer comprises an element selected from the group consisting of manganese, cerium, vanadium, and iron. In some embodiments, the metal-containing oxidizer is selected from the group consisting of $KMnO_4$, $(NH_4)_2Ce(NO_3)_6$, $NaVO_3$, $NH_4VO_3$, and $Fe(NO_3)_3$. In some embodiments, the composition has a pH of about 3 to about 6. In some embodiments, the zirconia particles are present in an amount of about 0.01 wt. % or more or about 0.2 wt. % or more. In some embodiments, the zirconia particles are present in an amount of about 2.5 wt. % of less. In some embodiments, the metal-containing oxidizer is present in an amount of about 0.05 mM or more or about 2 mM or more. Embodiments also include a reaction product formed by contacting the CMP composition of the embodiments with an amorphous carbon, SoC, or DLC surface. Embodiments also include a chemical mechanical polishing (CMP) composition comprising zirconia particles doped with yttria and a metal-containing oxidizer, and the particle sizes of the particles are less than 80 nm. In some embodiments, the zirconia particles are doped with more than 9 mol % of yttria. In some embodiments, a pH of the composition is about 2 to 6.

In addition, some embodiments below are provided.

1. A method of manufacturing a polished polishing object, comprising polishing a polishing object comprising amorphous carbon, spin-on carbon (SoC), or diamond like carbon (DLC) using a chemical mechanical polishing (CMP) composition comprising an abrasive comprising zirconia particles and a metal-containing oxidizer.

2. The method according to 1., in which an average primary particle size of the zirconia particles is about 3 to 110 nm, and an average secondary particle size of the zirconia particles is about 20 nm to about 2000 nm.

3. The method according to 1. or 2., in which the metal-containing oxidizer comprises an element selected from the group consisting of manganese, cerium, vanadium, and iron.

4. The method according to any one of 1. to 3., in which the metal-containing oxidizer is selected from the group consisting of $KMnO_4$, $(NH_4)_2Ce(NO_3)_6$, $NaVO_3$, $NH_4VO_3$, and $Fe(NO_3)_3$.

5. The method according to any one of 1. to 4., in which the composition has a pH of about 2 to about 7.

6. The method according to any one of 1. to 5., in which the zirconia particles are present in an amount of about 0.01 wt. % or more with respect to the chemical mechanical polishing (CMP) composition.

7. The method according to any one of 1. to 6., in which the zirconia particles are present in an amount of about 4.0 wt. % or less with respect to the chemical mechanical polishing (CMP) composition.

8. The method according to any one of 1. to 7., in which the metal-containing oxidizer is present in an amount of about 0.05 mM or more with respect to the chemical mechanical polishing (CMP) composition.

9. The method according to any one of 1. to 8., in which the zirconia particles comprise colloidal zirconia.

10. The method according to any one of 1. to 8., in which the zirconia particles comprise calcined zirconia.

11. The method according to any one of 1. to 8., in which the zirconia particles are doped with yttria.

12. The method according to 11., in which the zirconia particles are doped with more than 9 mol % of yttria.

13. A chemical mechanical polishing (CMP) composition comprising zirconia particles and a metal-containing oxidizer for the use of polishing a polishing object comprising amorphous carbon, spin-on carbon (SoC), or diamond like carbon (DLC).

DETAILED DESCRIPTION

Provided herein are CMP compositions and methods for polishing surfaces comprising amorphous carbon, SoC, and/or DLC films. As used herein, the term "chemical mechanical polishing" or "planarization" refers to a process of planarizing (polishing) a surface with the combination of surface chemical reaction and mechanical abrasion. In some embodiments, chemical reactions are initiated by applying a composition (interchangeably referred to as "polishing slurry", "polishing composition", "composition", "slurry composition", or simply "slurry") capable of reacting with a surface material to surfaces. The chemical reactions change the composition into products capable of more easily removing surface materials by simultaneous mechanical abrasion. In some embodiments, the mechanical abrasion is performed by contacting a polishing pad with the surface, and moving the polishing pad relative to the surface. DLC is used herein in accordance with how the term is understood in the art, and includes a variety of amorphous hydrogenated or non-hydrogenated forms of carbon which are metastable materials characterized by a mixture of sp2 and sp3 hybridized carbon bonds. DLC used in ICs is included within the meaning of the term.
Composition The CMP polishing compositions disclosed herein can comprise, consist essentially of, or consist of one or more of the following components.
Abrasive The CMP compositions of the present disclosure contain at least one abrasive having zirconia particles. In some embodiments, the zirconia particles are colloidal zirconia particles or milled/calcined zirconia particles. The abrasive in the CMP composition provides or enhances mechanical abrasion effects during the CMP process. The zirconia particles may be undoped or doped, e.g., with yttrium (Y) or an oxide thereof. In some embodiments, the milled/calcined zirconia particles are produced by calcination in a calcination furnace and then a milling step. More specifically, the object to be calcined is heated from room temperature (e.g., 20 to 25° C.) for, e.g., 1 to 10 hours, 1.2 to 5 hours, and, typically, about 2 hours. A heating rate at that time is, e.g., 100 to 1000° C./hour or 200 to 800° C./hour. After that, a calcination temperature is set such that the object reaches about 1300 to 1500° C., and the object is held so as to be in the temperature range for, e.g., 1 to 3 hours and, typically, about 2 hours. After that, the object is naturally cooled at room temperature. A time taken to initiate heating of the object to be calcined and returning the resultant to room temperature by natural cooling is, e.g., 3 to 20 hours and, typically, 7 to 8 hours.

In some embodiments, the zirconia particles are doped with yttria (Y-stabilized zirconia particles). In some embodiments, when calcined/milled zirconia is used as a raw material, the doped zirconia particles are preferably prepared by mixing a zirconia powder and an yttria powder before the calcination at fractions such that yttria has a predetermined amount of doping and calcining the powder mixture as described above to produce the doped zirconia particles. In some embodiments, when colloidal zirconia is used as a raw material, it is common to prepare the doped zirconia particles by reacting a necessary mole number of a precursor of Y and a necessary mole number of a precursor of Zr in advance and then making the reaction product into particles. Regarding a doping method, e.g., the contents of the specifications of Japanese Patent Laid-Open No. 2010-523451 or U.S. Pat. No. 3,110,681 can be referred to as appropriate, and such contents are incorporated into the present specification by reference.

The concentration of yttria in the Y-stabilized zirconia particles is defined as described below.

$$Y_2O_3 \text{ (mol \%)}=(\text{mol of } Y_2O_3)/[(\text{mol of } Y_2O_3)+(\text{mol of } ZrO_2)]\%. \qquad \text{[Expression 1]}$$

Mol % of yttria can be determined by an X-ray fluorescence (XRF) method or any other method that is known in the art. In some embodiments, the concentration of yttria in the Y-stabilized zirconia particles is at least 3 mol %, 4 mol %, 5 mol %, 6 mol %, 7 mol %, 8 mol %, 9 mol %, 10 mol %, 11 mol %, 12 mol %, 13 mol %, 14 mol %, or 15 mol %. In some embodiments, the concentration of yttria in the Y-stabilized zirconia particles is less than 45 mol %, 40 mol %, 35 mol %, 30 mol %, 25 mol %, or 20 mol %. In some embodiments, the concentration of yttria in the Y-stabilized zirconia particles is about 1, 2, 3, 4, 5, 6, 7, 8, 9, 10, 11, 12, 13, 14, 15, 16, 17, 18, 19, 20, 21, 22, 23, 24, or 25 mol % or in a range therebetween. In some embodiments, the concentration of yttria in the Y-stabilized zirconia particles is about 1 mol % or more or less, about 2 mol % or more or less, about 3 mol % or more or less, about 4 mol % or more or less, about 5 mol % or more or less, about 6 mol % or more or less, about 7 mol % or more or less, about 8 mol % or more or less, about 9 mol % or more or less, about 10 mol % or more or less, about 11 mol % or more or less, about 12 mol % or more or less, about 13 mol % or more or less, about 14 mol % or more or less, about 15 mol % or more or less, about 16 mol % or more or less, about 17 mol % or more or less, about 18 mol % or more or less, about 19 mol % or more or less, about 20 mol % or more or less, about 21 mol % or more or less, about 22 mol % or more or less, about 23 mol % or more or less, about 24 mol % or more or less, or about 25 mol % or more or less. In some embodiments, the Y-stabilized zirconia particles comprise tetragonal phase (e.g., the concentration of yttria in the Y-stabilized zirconia particles is high enough to providing tetragonal phase). In some embodiments, the Y-stabilized zirconia particles comprise cubic phase (e.g., the concentration of yttria in the Y-stabilized zirconia particles is high enough to providing cubic phase). In some embodiments, the concentration of yttria in the Y-stabilized zirconia particles is more than 2.6 mol %, more than 3.3 mol %, more than 9.3 mol %, or more than 10.6 mol %. The expression "X (X is a numerical value) or more or less" used herein means that the numerical value may be X or more or may be X or less herein. That is, the expression means that, at the time of amendment, the numerical value X can be a support for the lower limit and can be a support for the upper limit.

In some embodiments, the zirconia (e.g., colloidal zirconia or milled/calcined zirconia or doped zirconia) particle is an aggregate comprising primary particles, and optionally secondary particles. It will be understood that aggregates may be formed from a combination of individual particles, and these individual particles are known in the art as primary particles, whereas the agglomerated combination of particles are known in the art as secondary particles. The abrasive in the polishing composition can be in a form of primary particles or in a form of secondary particles which are aggregates of primary particles. Alternatively, the abrasive may be present both in the primary particle form and secondary particle form. In a preferable embodiment, the abrasive is present at least partially in a secondary particle form in the polishing composition.

In some embodiments, the average primary particle diameter of the zirconia (e.g., colloidal zirconia (including doped zirconia)) particles is preferably a measurement limit value or more, 3 nm or more, or 5 nm or more. In addition, the average primary particle diameter of the zirconia (e.g., colloidal zirconia (including doped zirconia)) particles is 15 nm or less, 10 nm or less, 9 nm or less, or 8 nm or less. In some embodiments, e.g., an average primary particle diameter ($D_{P1}$) with diameters of about 8 to 10 nm is included. In some embodiments, the zirconia (e.g., milled/calcined zirconia (including doped zirconia)) particles include an average primary particle diameter ($D_{P1}$) with a diameter of about 20 to 110 nm, e.g., about 20, about 25, about 30, about 40, about 50, about 60, about 70, about 80, about 90, about 100, or about 110 nm or in a range therebetween. In some embodiments, the zirconia (e.g., milled/calcined zirconia (including doped zirconia)) particles include an average primary particle diameter ($D_{P1}$) with diameters in the range of, e.g., about 20 nm or more or less, about 25 nm or more or less, about 30 nm or more or less, about 40 nm or more or less, about 50 nm or more or less, about 60 nm or more or less, about 70 nm or more or less, about 80 nm or more or less, about 90 nm or more or less, about 100 nm or more or less, or about 110 nm or more or less. In some embodiments, the zirconia (e.g., milled/calcined zirconia (including doped zirconia)) particles include an average primary particle diameter ($D_{P1}$) with diameters of more than 65 nm.

In some embodiments, the average primary particle size ($D_{P1}$) of the abrasive can be determined from a specific surface area S ($m^2$/g) measured by the BET method based on, e.g., a formula of the average primary particle size $D_{P1}$ (nm)=2727/S. The abrasive's specific surface area can be measured by using, for instance, a surface area analyzer under trade name "FLOW SORB II 2300" available from Micromeritics. In some embodiments, the average primary particle size of the abrasive can be calculated as the volume-average particle size of 100 particles using image analysis-type particle size distribution software MacView manufactured by Mountech Co., Ltd. after capturing the abrasive using SEM SU8000 manufactured by Hitachi High-Tech Corporation.

In some embodiments, the average secondary particle size ($D_{P2}$) of the abrasive (e.g., colloidal zirconia (including doped zirconia)) is not particularly limited. From the viewpoint of the polishing rate or the like, the average secondary particle size ($D_{P2}$) is 10 nm or more, 15 nm or more, 20 nm or more, 30 nm or more, 40 nm or more, 50 nm or more, 60 nm or more, 65 nm or more, 70 nm or more, 75 nm or more, or 80 nm or more. In some embodiments, the average secondary particle size $D_{P2}$ of the abrasive (e.g., colloidal zirconia (including doped zirconia)) is 200 nm or less, 150 nm or less, 100 nm or less, 60 nm or less, less than 49 nm, less than 48 nm, less than 33 nm, less than 21 nm, or less than 17 nm. In some embodiments, the average secondary particle size of the aggregate is a diameter of about 40, 60, 65, 70, 75, or 80 nm or in a range therebetween. In some embodiments, the average secondary particle size of the aggregate is about 40 nm or more or less, about 60 nm or more or less, about 65 nm or more or less, about 70 nm or more or less, about 75 nm or more or less, or about 80 nm or more or less.

In some embodiments, the zirconia (e.g., milled/calcined zirconia (including doped zirconia)) particles include an average secondary particle size ($D_{P2}$) with diameters of about 80 to 2000 nm. In some embodiments, the average secondary particle size (the average secondary particle size ($D_{P2}$) of zirconia (e.g., milled/calcined zirconia) particles) of the aggregate is about 80, 90, 100, 150, 200, 300, 400, 500, 600, 700, 800, 900, 1000, 1100, 1200, 1300, 1400, 1500, 1600, 1700, 1800, 1900, or 2000 nm or in a range therebetween. In some embodiments, the average secondary particle size (the average secondary particle size ($D_{P2}$) of zirconia (e.g., milled/calcined zirconia (including doped zirconia) particles) is about 80 nm or more or less, about 90 nm or more or less, about 100 nm or more or less, about 150 nm or more or less, about 200 nm or more or less, about 300 nm or more or less, about 400 nm or more or less, about 500 nm or more or less, about 600 nm or more or less, about 700 nm or more or less, about 800 nm or more or less, about 900 nm or more or less, about 1000 nm or more or less, about 1100 nm or more or less, about 1200 nm or more or less, about 1300 nm or more or less, about 1400 nm or more or less, about 1500 nm or more or less, about 1600 nm or more or less, about 1700 nm or more or less, about 1800 nm or more or less, about 1900 nm or more or less, or about 2000 nm or more or less. In some embodiments, the average secondary particle size (the average secondary particle size ($D_{P2}$) of zirconia (e.g., milled/calcined zirconia (including doped zirconia) particles) is more than 135 nm.

The average secondary particle size $D_{P2}$ of the abrasive can be obtained by measuring an aqueous dispersion of a target abrasive (dispersion having a composition not comprising a water-soluble polymer) as a measurement sample by dynamic light scattering for which, e.g., model "UPA-UT151" available from Nikkiso Co., Ltd. is used. In some embodiments, the average secondary particle size $D_{P2}$ of the abrasive can also be measured with Malvern Zetasizer Nano ZS (measurement condition: temperature of 25° C., dilution of sample: none, measurement result: average value of three measurements).

In some embodiments, the doped zirconia has a particle diameter (average secondary particle size) of about 10 to about 80 nm, e.g., about 10, 20, 30, 40, 50, 60, 70, or 80 nm. In some embodiments, the doped zirconia has a particle diameter (average secondary particle size) of, e.g., about 10 nm or more or less, about 20 nm or more or less, about 30 nm or more or less, about 40 nm or more or less, about 50 nm or more or less, about 60 nm or more or less, about 70 nm or more or less, or about 80 nm or more or less. In some embodiments, the doped zirconia has a particle diameter (average secondary particle size) of 10 to 50 nm, or 10 to 40 nm. In some embodiments, the average secondary particle size $D_{P2}$ of the doped zirconia is less than 49 nm, less than 48 nm, less than 33 nm, less than 21 nm, or less than 17 nm.

In some embodiments, the present CMP composition comprises about 0.01 wt. % to about 4 wt. % of a zirconia (e.g., colloidal zirconia, milled/calcined zirconia, or doped zirconia) particle abrasive. In some embodiments, the present CMP composition comprises about 0.1 wt. % to about 3 wt. % of a zirconia (e.g., colloidal zirconia, milled/calcined zirconia, or doped zirconia) particle abrasive. For example, the present CMP composition comprises about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 wt. % of a zirconia (e.g., colloidal zirconia, milled/calcined zirconia, or doped zirconia) particle abrasive. For example, the present CMP composition comprises about 0.1 wt. % or more or less, about 0.2 wt. % or more or less, about 0.3 wt. % or more or less, about 0.4 wt. % or more or less, about 0.5 wt. % or more or less, about 0.6 wt. % or more or less, about 0.7 wt. % or more or less, about 0.8 wt. % or more or less, about 0.9 wt. % or more or less, about 1.0 wt. % or more or less, about 1.1 wt. % or more or less, about 1.2 wt. % or more or less, about 1.3 wt. % or more or less, about 1.4 wt. % or more or less, about 1.5 wt. % or more or less, about 1.6 wt. % or more or less, about 1.7 wt. % or more or less, about 1.8 wt. % or more or less, about 1.9 wt. % or more or less, about 2.0 wt. % or more or less, about 2.1 wt. % or more or less, about 2.2 wt. % or more or less, about 2.3 wt. % or more or less, about 2.4 wt. % or more or less, about 2.5 wt. % or more or less, about 2.6 wt. % or more or less, about 2.7 wt. % or more or less, about 2.8 wt. % or more or less, about 2.9 wt. % or more or less, about 3.0 wt. % wt. % or more or less, or about 4.0 wt. % or more or less of a zirconia (e.g., colloidal zirconia, milled/calcined zirconia, or doped zirconia) particle abrasive. In some embodiments, the present CMP composition comprises more than 0.05 wt. %, more than 0.1 wt. %, more than 0.3 wt. %, or more than 0.5 wt. % of a zirconia (e.g., colloidal zirconia, milled/calcined zirconia, or doped zirconia) particle abrasive. In some embodiments, the present CMP composition comprises less than 3.0 wt. % of a zirconia (e.g., colloidal zirconia, milled/calcined zirconia, or doped zirconia) particle abrasive.

In some embodiments, the present CMP composition comprises about 0.01 wt. % to about 0.3 wt. % of a zirconia (e.g., colloidal zirconia, milled/calcined zirconia, or doped zirconia) particle abrasive. For example, the present CMP composition comprises about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, or 0.3 wt. % of a zirconia (e.g., colloidal zirconia, milled/calcined zirconia, or doped zirconia) particle abrasive. In some embodiments, e.g., the present CMP composition comprises about 0.01 wt. % or more or less, about 0.02 wt. % or more or less, about 0.03 wt. % or more or less, about 0.04 wt. % or more or less, about 0.05 wt. % or more or less, about 0.06 wt. % or more or less, about 0.07 wt. % or more or less, about 0.08 wt. % or more or less, about 0.09 wt. % or more or less, about 0.1 wt. % or more or less, about 0.11 wt. % or more or less, about 0.12 wt. % or more or less, about 0.13 wt. % or more or less, about 0.14 wt. % or more or less, about 0.15 wt. % or more or less, about 0.16 wt. % or more or less, about 0.17 wt. % or more or less, about 0.18 wt. % or more or less, about 0.19 wt. % or more or less, about 0.2 wt. % or more or less, about 0.21 wt. % or more or less, about 0.22 wt. % or more or less, about 0.23 wt. % or more or less, about 0.24 wt. % or more or less, 0.25 wt. % or more or less, about 0.26 wt. % or more or less, about 0.27 wt. % or more or less, about 0.28 wt. % or more or less, about 0.29 wt. % or more or less, or about 0.3 wt. % wt. % or more or less of a zirconia (e.g., colloidal zirconia, milled/calcined zirconia, or doped zirconia) particle abrasive.

Metal-Containing Oxidizer

The CMP compositions of the present disclosure may also contain at least one metal-containing oxidizer. An oxidizer may be added to the present CMP composition to oxidize a surface of a polishing object, thereby enhancing the removal rate of the CMP process. In some embodiments, an oxidizer is added to the CMP composition only prior to use. In other embodiments, an oxidizer is mixed with other ingredients of the CMP composition at approximately the same time during a manufacturing procedure. In some embodiments, the present composition is manufactured and sold as a stock composition, and an end customer can choose to dilute the stock composition as needed and/or add a suitable amount of an oxidizer before using.

Examples of the metal in the metal-containing oxidizer which may be used include, but are not limited to, manganese, cerium, vanadium, and iron. Examples of the metal-containing oxidizer which may be used include, but are not limited to, $KMnO_4$, $(NH_4)_2Ce(NO_3)_6$, $NaVO_3$, $NH_4VO_3$, and $Fe(NO_3)_3$.

Suitable content of the metal-containing oxidizer can be determined based on particular needs. In some embodiments, content of the metal-containing oxidizer in the CMP composition is about 0.05 mM or more or about 2 mM or more. For example, the content of the metal-containing oxidizer may be about 2, 3, 4, 5, 6, 7, 8, 9, 10, 15, 20, 25, 30, 35, 40, 45, 50, 55, 60, 65, 70, or 75 mM, or a range therein between. In some embodiments, the content of the metal-containing oxidizer in the CMP composition is about 2 mM or more or less, about 3 mM or more or less, about 4 mM or more or less, about 5 mM or more or less, about 6 mM or more or less, about 7 mM or more or less, about 8 mM or more or less, about 9 mM or more or less, about 10 mM or more or less, about 15 mM or more or less, about 20 mM or more or less, about 25 mM or more or less, about 30 mM or more or less, about 35 mM or more or less, about 40 mM or more or less, about 45 mM or more or less, about 50 mM or more or less, about 55 mM or more or less, about 60 mM or more or less, about 65 mM or more or less, about 70 mM or more or less, or about 75 mM or more or less. In some embodiments, the content of the metal-containing oxidizer in the CMP composition is about 0.05 mM or more, about 0.1 mM or more, about 0.15 mM or more, about 0.2 mM or more, about 0.3 mM or more, about 0.4 mM or more, about 0.5 mM or more, about 0.6 mM or more, about 0.7 mM or more, about 0.8 mM or more, about 0.9 mM or more, about 1.0 mM or more, about 1.1 mM or more, about 1.2 mM or more, about 1.3 mM or more, about 1.4 mM or more, about 1.5 mM or more, about 1.6 mM or more, about 1.7 mM or more, about 1.8 mM or more, about 1.9 mM or more, or about 2.0 mM or more. For example, the content of the metal-containing oxidizer may be about 0.01, 0.02, 0.03, 0.04, 0.05, 0.06, 0.07, 0.08, 0.09, 0.1, 0.15, 0.20, 0.25, 0.30, 0.35, 0.40, 0.45, 0.50, 0.55, 0.60, 0.65, 0.70, 0.75, 0.8, 0.85, 0.9, 0.95, 1, 1.1, 1.2, 1.3, 1.4, 1.5, 1.6, 1.7, 1.8, 1.9, 2, 3, 4, 5, 6, 7, 8, 9, 10, 15, 20, 25, 30, 35, 40, 45, 50, 55, 60, 65, 70, or 75 mM, or a range therein between. In some embodiments, the content of the metal-containing oxidizer in the CMP composition is about 0.01 mM or more or less, about 0.02 mM or more or less, about 0.03 mM or more or less, about 0.04 mM or more or less, about 0.05 mM or more or less, about 0.06 mM or more or less, about 0.07 mM or more or less, about 0.08 mM or more or less, about 0.09 mM or more or less, about 0.1 mM or more or less, about 0.15 mM or more or less, about 0.20 mM or more or less, about 0.25 mM or more or less, about 0.30 mM or more or less, about 0.35 mM or more or less, about 0.40 mM or more or less, about 0.45 mM or more or less, about 0.50 mM or more or less, about 0.55 mM or more or less, about 0.60 mM or more or less, about 0.65 mM or more or less, about 0.70 mM or more or less, about 0.75 mM or more or less, about 0.8 mM or more or less, about 0.85 mM or more or less, about 0.9 mM or more or less, about 0.95 mM or more or less, about 1 mM or more or less, about 1.1 mM or more or less, about 1.2 mM or more or less, about 1.3 mM or more or less, about 1.4 mM or more or less, about 1.5 mM or more or less, about 1.6 mM or more or less, about 1.7 mM or more or less, about 1.8 mM or more or less, about 1.9 mM or more or less, about 2 mM or more or less, about 3 mM or more or less, about 4 mM or more or less, about 5 mM or more or less, about 6 mM or more or less, about 7 mM or more or less, about 8 mM or more or less, about 9 mM or more or less, about 10 mM or more or less, about 15 mM or more or less, about 20 mM or more or less, about 25 mM or more or less, about 30 mM or more or less, about 35 mM or more or less, about 40 mM or more or less, about 45 mM or more or less, about 50 mM or more or less, about 55 mM or more or less, about 60 mM or more or less, about 65 mM or more or less, about 70 mM or more or less, or about 75 mM or more or less. In some embodiments, the content of the metal-containing oxidizer in the CMP composition is more than 0.1 mM, more than 1.2 mM. more than 3.2 mM, more than 6.3 mM, or more than 25 mM.

pH Adjusting Agent

In some embodiments, the present CMP composition further comprises at least one pH adjusting agent. In some embodiments, the pH of the present CMP composition is not particularly limited, but is in the range of about 2 to about 7, including an end point. The pH of the present CMP composition is not particularly limited, but is in the range of about 3 to about 6, including an end point. For example, in some embodiments, the pH of the present CMP composition is about 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2, or a range therein between. In some embodiments, the pH of the present CMP composition is about 1.8 or more or less, about 2 or more or less, about 2.2 or more or less, about 2.4 or more or less, about 2.6 or more or less, about 2.8 or more or less, about 3 or more or less, about 3.2 or more or less, about 3.4 or more or less, about 3.6 or more or less, about 3.8 or more or less, about 4 or more or less, about 4.2 or more or less, about 4.4 or more or less, about 4.6 or more or less, about 4.8 or more or less, about 5 or more or less, about 5.2 or more or less, about 5.4 or more or less, about 5.6 or more or less, about 6 or more or less, about 6.2 or more or less, or about 7 or more or less. In some embodiments (e.g., when colloidal zirconia is used as the abrasive), the pH of the present CMP composition is more than 2.3. In some embodiments (e.g., when colloidal zirconia is used as the abrasive), the pH of the present CMP composition is less than 6.7 or less than 5.2. In some embodiments (e.g., when doped zirconia is used as the abrasive), the pH of the present CMP composition is more than 2.21. In some embodiments (e.g., when doped zirconia is used as the abrasive), the pH of the present CMP composition is less than 5.52, less than 4.61, or less than 4.01.

In some embodiments, an acid is used as the pH adjusting agent. The acid used in connection with the present invention can be organic or inorganic compounds. Examples of the acid include inorganic acids such as sulfuric acid, nitric acid, boric acid, carbonic acid, hypophosphorous acid, phosphorous acid, and phosphoric acid; and organic acids such as carboxylic acids including formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid, and organic sulfuric acids including methanesulfonic acid, ethanesulfonic acid, and isethionic acid.

Content of the acid in the CMP composition is not particularly limited as long as it is an amount allowing the CMP composition to be within the aforementioned pH range.

Other Components

The CMP composition of the present invention may contain, if necessary, other components, such as a preservative, a biocide, a reducing agent, a polymer, a surfactant, or the like.

In some embodiments, the CMP composition according to the present disclosure may also comprise a biocide or other preservatives. Examples of preservatives and biocides that can be used in connection with the present invention include isothiazoline-based preservatives such as 2-methyl-4-isothiazolin-3-one or 5-chloro-2-methyl-4-isothiazolin-3-one, para-hydroxybenzoate ester, and phenoxyethanol. These preservatives and biocides may be used either alone or in mixture of two or more kinds thereof.

In some embodiments, the CMP composition substantially does not comprise any of non-metal-containing oxidizers such as $H_2O_2$, $NH_4IO_4$, and $(NH_4)_2S_2O_8$. "Substantially not comprise (contain)" used herein includes not only when the CMP composition does not comprise any non-metal-containing oxidizer but also when the CMP composition comprises 50 wt. ppm or less, 20 wt. ppm or less, or 10 wt. ppm or less of a non-metal-containing oxidizer. "Weight" and "mass" are herein interchangeable.

In some embodiments, the CMP composition does not contain an abrasive other than zirconia particles, such as silica, alumina, ceria, and titania particles. In some embodiments, the CMP composition substantially does not contain an abrasive other than colloidal zirconia particles.

Methods and Compositions

In some embodiments, provided is a method of manufacturing a polished object, comprising polishing a polishing object comprising amorphous carbon, spin-on carbon (SoC), or diamond like carbon (DLC) using a chemical mechanical polishing (CMP) composition comprising an abrasive comprising zirconia particles and a metal-containing oxidizer. In addition, provided are chemical mechanical polishing (CMP) compositions comprising zirconia particles and a metal-containing oxidizer, for use in polishing amorphous carbon, spin-on carbon (SoC), or diamond like carbon (DLC).

In another aspect of the present disclosure, provided herein are methods for CMP of an object having at least one surface. The method comprises contacting the surface with a polishing pad; delivering a CMP composition according to the present disclosure to the surface; and polishing said surface with the CMP composition. In some embodiments, the surface includes amorphous carbon, SoC, and/or DLC. A polished polishing object can be manufactured by performing CMP.

Examples of an object to be polished (polishing object) may include silicon nitride, silicon oxide, amorphous silicon (a-Si), or polysilicon.

Regarding this point, examples of an object to be polished comprising silicon oxide include a tetraethyl orthosilicate (TEOS) type silicon oxide film (hereinafter, also simply referred to as "TEOS") formed using tetraethyl orthosilicate as a precursor, a high-density plasma (HDP) film, an undoped silicate glass (USG) film, a phosphosilicate glass (PSG) film, a borophosphosilicate glass (BPSG) film, and a rapid thermal oxide (RTO) film.

In another aspect of the present disclosure, provided herein are methods for increasing the removal rate of amorphous carbon, SoC, or DLC from a surface, comprising contacting the surface with a slurry comprising an abrasive having zirconia particles and a metal-containing oxidizer, and polishing the surface. In some embodiments, the removal rate is increased when compared to a removal rate using a similar slurry composition having silica and/or a non-metal-containing oxidizer in place of zirconia particles and/or the metal-containing oxidizer. In some embodiments, the slurry is a CMP composition according to the present disclosure.

In another aspect of the present disclosure, provided herein are systems for chemical mechanical polishing (CMP). The system comprises a substrate comprising at least one surface having amorphous carbon, SoC, or DLC material, a polishing pad, and a CMP composition according to the present disclosure.

In still another aspect of the present disclosure, provided herein are substrates comprising at least one surface having amorphous carbon, SoC, or DLC, and the substrates are formed by contacting with the chemical mechanical polishing (CMP) composition according to the present disclosure.

In some embodiments, the present methods and compositions are suitable for polishing an amorphous carbon, SoC, or DLC surface. An apparatus or conditions commonly used for Co polishing can be adopted and modified according to particular needs. The selections of a suitable apparatus and/or conditions for carrying out the present methods are within the knowledge of a skilled artisan.

In some embodiments, the present methods result in amorphous carbon, SoC, or DLC removal rate of greater than about 40, 60, 80, 85, 90, 100, 120, 140, 160, 180, 200, 300, 400, 500, 600, 700, 800, 900, or 1,000 Å/min.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

The term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term. Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

This disclosure is not limited to particular embodiments described, as such may, of course, vary. It is also to be understood that the terminology used herein is for the purpose of describing particular embodiments only, and is not intended to be limiting, since the scope of the present invention will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order that is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates that may need to be independently confirmed.

The following examples are given for the purpose of illustrating various embodiments of the disclosure and are not meant to limit the present disclosure in any fashion. One skilled in the art will appreciate readily that the present disclosure is well adapted to carry out the objects and obtain the ends and advantages mentioned, as well as those objects, ends and advantages inherent herein. The present examples, along with the methods described herein are presently representative of embodiments and are exemplary, and are not intended as limitations on the scope of the disclosure. Changes therein and other uses which are encompassed within the spirit of the disclosure as defined by the scope of the claims will occur to those skilled in the art.

EXAMPLES

Example 1: Effect of Particle and Oxidizer on Removal Rate

Slurries with silica or zirconia particles and certain oxidizers were prepared, and a benchtop polisher was used to polish a diamond-like carbon (DLC) film surface. The results are shown in Table 1.

Hereinafter, when simply zirconia or zirconia particles are mentioned, it refers to colloidal zirconia.

TABLE 1

| Particles | Oxidizer | Removal rate ((Å/minute)) |
|---|---|---|
| Silica (average primary particle size: 20 nm; average secondary particle size: 48 nm) (1 wt. %) | None | 3 |
| | Permanganate | 17 |
| Zirconia (average primary particle size: less than 5 nm; average secondary particle size: 48 nm) (1 wt. %) | None | 4 |
| | Periodate | 5 |
| | Persulfate | 14 |
| | Permanganate | 121 |

\* Slurry pH = 5.2, oxidizer with concentration of 25 mM
\* Permanganate = KMnO₄, periodate = KIO₄, persulfate = (NH₄)₂S₂O₈
\* pH adjusting agent: 3.5 g/L of acetic acid ("3.5 g/L" is the concentration of acetic acid in an acetic acid aqueous solution)
\* Polishing conditions
\* Benchtop polisher = Multiprep, Allied High Tech Products, Inc.
\* Pad = Fujibo H7000, pressure = 2 psi, platen/head = 200/23 rpm
\* Slurry flow rate = 50 mL/minute
\* Wafer = amorphous carbon (300 mm wafer, DK Nanotechnology)
\* Wafer cut to 1.5 × 1.5 for benchtop polishing
\* pH measurement method
The pHs were measured with Thermo Orion 920Aplus (the manufacturer is Thermo Fisher Scientific, Inc.).
\* Average secondary particle sizes
The average secondary particle sizes were measured with Malvern Zetasizer Nano ZS (measurement condition: temperature of 25° C., dilution of sample: none, measurement result: average value of three measurements). The average secondary particle sizes described in the present example were all calculated in this manner.

Slurries with silica or zirconia particles alone only produce very low removal rates. So, an oxidizer is added to oxidize the surface of carbon film in order to mechanically polish the film. Even slurries based on zirconia particles having a periodate and a persulfate, respectively, do not produce high removal rates (only 5 Å/min and 14 Å/min, respectively). A slurry with zirconia particle and permanganate oxidizer produces much higher removal rate (121 Å/min) than slurries with periodate and persulfate (5 and 14 Å/min).

Synergistic effect of zirconia and permanganate: As shown above, the slurries based on zirconia particles having a persulfate and a periodate, respectively, which are strong non-metal-containing oxidizers, do not produce high removal rates. The slurry with silica and permanganate does not produce a high removal rate. The combination of metal oxide zirconia particle and metal-containing permanganate produces much higher removal rate. Therefore, the combination of zirconia particles and a permanganate oxidizer has a synergistic effect. Without being bound by theory, it is believed that permanganate oxidizes the surfaces of carbon films and helps to form a C—O—Mn bond, and, in contrast, zirconia particles are pulled to surfaces to enhance mechanical polishing. Zirconia particle and permanganate oxidizer work together to produce very high removal rate.

Example 2: Effect of pH

CMP compositions comprising the same concentration of zirconia and permanganate were produced at different pH. A benchtop polisher using the various CMP compositions was used to polish a DLC surface. The results are shown in Table 2.

TABLE 2

| pH | EC (Electric Conductivity) (mS/cm) | Removal rate ((Å/minute)) |
|---|---|---|
| 2.3 | 4.79 | 79 |
| 3.6 | 2.60 | 151 |
| 5.2 | 4.34 | 121 |
| 6.7 | 5.10 | 50 |

\* Zirconia particles (average secondary particle size: 48 nm) = 1 wt. %, permanganate = 25 mM
\* The pHs are adjusted with 3.5 g/L of acetic acid as appropriate.
\* The same polishing conditions as in Table 1
\* The electric conductivity was measured with Thermo ORION Model125 (the manufacturer is Thermo Fisher Scientific, Inc.).

Table 2 shows that removal rates are higher at pHs of 3.6 to 5.2 than at a pH of 2.3 and a pH of 6.7 (weakly acidic pH). Without being bound by theory, it is believed that the observed effect of pHs on removal rates is a combined effect of a plurality of processes comprising a pH effect on the oxidation of DLC films by a permanganate, a pH effect on zeta potentials of zirconia particles and DLC films, and a pH effect on the charge-charge interaction between particles and films.

Example 3: Effect of Zirconia Concentration on Removal Rate

CMP compositions comprising the same concentration of permanganate and pH were produced at different concentration of zirconia. The results are shown in Table 3.

TABLE 3

| Zirconia particles (wt. %) (Average primary particle size: less than 5 nm; average secondary particle size: 48 nm) | Removal rate (Å/minute) |
|---|---|
| 0.1% | 59 |
| 0.3% | 132 |
| 0.5% | 149 |
| 1.0% | 151 |
| 3.0% | 96 |

\* Slurry pH = 3.6, permanganate = 25 mM
\* pH adjusting agent: 3.5 g/L of acetic acid
\* The same polishing conditions as in Table 1

Table 3 shows that wt. % of the zirconia particles within the range of more than 0.1 wt. % to less than 3 wt. % has a meaningful effect on removal rates.

Example 4: Effect of KMnO₄ Concentration on Removal Rate

CMP compositions comprising the same concentration of zirconia and pH were produced at different concentration of permanganate. The results are shown in Table 4.

TABLE 4

| Permanganate (mM) | EC (mS/cm) | Removal rate (Å/minute) |
|---|---|---|
| 1.2 | 0.28 | 87 |
| 3.2 | 0.50 | 122 |
| 6.3 | 0.85 | 137 |
| 25 | 3.00 | 151 |
| 63 | 5.90 | 162 |

\* Zirconia particles (average primary particle size: less than 5 nm; average secondary particle size: 48 nm) = 1 wt. %, slurry pH = 3.6
\* pH adjusting agent: 3.5 g/L of acetic acid
\* The same polishing conditions as in Table 1

Table 4 shows that an increase in permanganate from 3.2 mM to 25 mM (particularly, 63 mM) increases the removal rates.

Example 5: Effect of Zirconia Particle

CMP compositions comprising the same concentration of zirconia, permanganate and pH were produced at different types of zirconia. The results are shown in Table 5.

TABLE 5

| Zirconia particles | Primary particles (average primary particle size) | Secondary particles (average secondary particle size) | Removal rate (Å/minute) |
|---|---|---|---|
| | Average particle size (nm) | | |
| Current-colloidal | 9 | 60 | 151 |
| Other-milled/calcined | 65 | 135 | 45 |
| Other-milled/calcined | 90 | 1200 | 130 |

\* Slurry pH = 3.6, zirconia particles = 0.5 wt. %, permanganate = 25 mM
\* pH adjusting agent: 3.5 g/L of acetic acid
\* The same polishing conditions as in Table 1

Table 5 shows that the removal rates are also efficient with calcined zirconia as with colloidal zirconia.

Example 6: SoC Polishing

TABLE 6

| Oxidizer and concentration thereof | concentration thereof | Zirconia particles (wt. %) | Removal rate (Å/minute) | | |
|---|---|---|---|---|---|
| | | | SoC | TEOS | a-Si |
| None | — | 0.03 | 36 | <5 | <5 |
| H$_2$O$_2$ | 260 mM | 0.03 | 37 | <5 | <5 |
| Persulfate | 9 mM | 0.03 | 43 | <5 | <5 |
| Permanganate | 0.2 mM | 0.03 | 1180 | <5 | <5 |
| Permanganate | 1.0 mM | 0.03 | 1876 | <5 | <5 |
| Permanganate | 0.1 mM | 0.03 | 894 | <5 | <5 |
| Permanganate | 0.2 mM | 0.2 | 2234 | <5 | <5 |
| Permanganate | 0.2 mM | 0.05 | 1342 | <5 | <5 |
| Permanganate | 0.2 mM | 0.02 | 471 | <5 | <5 |
| Permanganate | 0.2 mM | 0.01 | 99 | <5 | <5 |

\* Films to be polished: SoC = spin-on carbon, TEOS = (tetraethyl orthosilicate-derived) SiO$_2$, a-Si = amorphous carbon Si
\* Slurry pH = 4.1 (pH adjusting agent: 3.5 g/L of acetic acid), zirconia particles = same as in Tables 1 to 4
\* The same polishing conditions as in Table 1

Table 6 shows that slurries based on 0.03 wt. % of colloidal zirconia do not produce high SoC removal rates even when a peroxide and a persulfate, that is, H$_2$O$_2$ and (NH$_4$)$_2$S$_2$O$_8$, respectively, are used as an oxidizer. However, when KMnO$_4$ is used as an oxidizer, slurries with 0.03 wt. % of colloidal zirconia produce very high SoC removal rates. Further, as described above, the concentrations of zirconia and/or the oxidizer can be changed while polishing performance is maintained. As described above, these slurries achieve very high SoC/TEOS and SoC/a-Si selectivity in spite of the use of very low concentrations of zirconia and KMnO$_4$.

Example 7: Y-Stabilized Zirconia Particle and KMnO$_4$ Oxidizer

The following slurries were tested, and removal rate of amorphous carbon film was measured.

TABLE 7

| Slurry | Abrasive | Oxidizer | pH | RR (Å/minute) |
|---|---|---|---|---|
| 1a | Silica (average primary particle size: 20 nm; average secondary particle size: 48 nm) | None | 3.43 | 4 |
| 1b | Zirconia (average primary particle size: less than 5 nm; average secondary particle size: 48 nm) | None | 3.43 | 8 |
| 1c | Zirconia (average primary particle size: less than 5 nm; average secondary particle size: 48 nm) | Permanganate | 3.43 | 199 |
| 1d | Y-stabilized zirconia (9.3 mol %) (average primary particle size: less than 5 nm; average secondary particle size: 21 nm) | None | 3.45 | 9 |
| 1e | Y-stabilized zirconia (9.3 mol %) (average primary particle size: less than 5 nm; average secondary particle size: 21 nm) | H$_2$O$_2$ | 3.46 | 14 |
| 1f | Y-stabilized zirconia (9.3 mol %) (average primary particle size: less than 5 nm; average secondary particle size: 21 nm) | Persulfate | 3.49 | 23 |
| 1g | Y-stabilized zirconia (9.3 mol %) (average primary particle size: less than 5 nm; average secondary particle size: 21 nm) | Permanganate | 3.43 | 314 |

\* Slurry production method
\* All abrasives = 0.3 wt. %
\* Mol % = mol % of Y$_2$O$_3$ in particles = (mol of Y$_2$O$_3$)/[(mol of Y$_2$O$_3$) + (mol of ZrO$_2$)]%
\* H$_2$O$_2$ = 1 wt. %;
\* Permanganate: KMnO$_4$ = 6.3 mM; persulfate: (NH$_4$)$_2$S$_2$O$_8$ = 6.3 mM
\* The pHs of the slurries adjusted using 3.5 g/L of acetic acid are adjusted except the slurry 1f (not adjusted).
\* Polishing conditions
\* Polisher = Applied Materials Reflexion LK
\* Pad = DOW IC1010, pressure = 3 psi, speed = 130 rpm, slurry flow rate = 150 mL/minute
\* RR = removal rate of amorphous carbon film (300 mm wafer, DK Nanotechnology)
\* The Y-stabilized zirconia is colloidal zirconia doped with yttria, which is also true in all of the following examples.

Slurries 1a, 1b, and 1d with silica, zirconia, or Y-stabilized zirconia particle only produce very low removal rate (4, 8, and 9 Å/min, respectively). Therefore, an oxidizer is needed to oxidize the surface of carbon film in order to mechanically polish the film at a high removal rate. Even slurries 1e and 1f based on Y-stabilized zirconia particles comprising a peroxide (H$_2$O$_2$) and a persulfate do not produce high removal rates (only 14 Å/min and 23 Å/min, respectively). Therefore, even slurries comprising a strong oxidizer such as a peroxide or a persulfate do not produce a high removal rate. Slurries 1c and 1g with zirconia or Y-stabilized zirconia particle and permanganate oxidizer produce much higher removal rate (199 and 314 Å/min, respectively). Therefore, KMnO$_4$ is a unique oxidizer that enables high removal rate of carbon film by slurry based on zirconia and Y-stabilized zirconia particle. Slurry 1g based on Y-stabilized zirconia particle and KMnO$_4$ produces significantly higher removal rate that slurry 1c based on zirconia particle and KMnO$_4$ (314 vs. 199 Å/min).

Example 8: Effect of Mol % Fraction of Yttria in Y-Stabilized Zirconia Particles The following slurries were tested, and removal rate of amorphous carbon film was measured.

TABLE 8

| Slurry | Abrasive | Size (average primary particle size) (nm) | Size (average secondary particle size) (nm) | Oxidizer | pH | RR (Å/minute) |
|---|---|---|---|---|---|---|
| 2a | Zirconia | Less than 5 nm | 48 | Permanganate | 3.28 | 199 |
| 2b | Y-stabilized zirconia (2.6 mol %) | Less than 5 nm | 33 | Permanganate | 3.29 | 227 |
| 2c | Y-stabilized zirconia (3.3 mol %) | Less than 5 nm | 49 | Permanganate | 3.30 | 229 |
| 2d | Y-stabilized zirconia (9.3 mol %) | Less than 5 nm | 21 | Permanganate | 3.43 | 314 |
| 2e | Y-stabilized zirconia (10.6 mol %) | Less than 5 nm | 17 | Permanganate | 3.49 | 321 |
| 2f | Y-stabilized zirconia (13.7 mol %) | Less than 5 nm | 13 | Permanganate | 3.66 | 398 |

* The slurry production method (formulations) and the polishing conditions are the same as in Table 7.
* Particle sizes = Z-AVG measurement by dynamic light scattering method (Malvern Zetasizer Nano ZS)
* Slurry 2d = 1 g
* The pHs of the slurries are adjusted as appropriate using 3.5 g/L of acetic acid as necessary.

Table 8 shows that the mol % fraction of yttria in the Y-stabilized zirconia particles increases and the removal rates become high at the same time.

Without being bound by theory, it is believed that the improvement of removal rate by Y-stabilization can be attributed to both physical and chemical changes resulted from the replacement of $Zr^{4+}$ ions by $Y^{3+}$ ions. Pure zirconia has monoclinic phase. As the mol % fraction of yttria ment in removal rate increases as density of $O^{2-}$ vacancy increases with increasing mol % of $Y_2O_3$ in Y-stabilized zirconia particle.

Example 9: Effect of Particle Size

The following slurries were tested, and removal rate of amorphous carbon film was measured.

TABLE 9

| Slurry | Abrasive | Size (average primary particle size) (nm) | Size (average secondary particle size) (nm) | Oxidizer | pH | RR (Å/minute) |
|---|---|---|---|---|---|---|
| 3a | Y-stabilized zirconia (9.3 mol %) | Less than 5 nm | 29 | Permanganate | 3.47 | 302 |
| 3b | Y-stabilized zirconia (9.3 mol %) | Less than 5 nm | 27 | Permanganate | 3.50 | 334 |
| 3c | Y-stabilized zirconia (9.3 mol %) | Less than 5 nm | 21 | Permanganate | 3.43 | 314 |
| 3d | Y-stabilized zirconia (9.3 mol %) | Less than 5 nm | 19 | Permanganate | 3.44 | 310 |
| 3e | Y-stabilized zirconia (9.3 mol %) | Less than 5 nm | 17 | Permanganate | 3.45 | 321 |
| 3f | Y-stabilized zirconia (9.3 mol %) | Less than 5 nm | 16 | Permanganate | 3.42 | 328 |

* The slurry production method (formulations) and the polishing conditions are the same as in Table 7.
* Particle sizes = Z-AVG measurement by dynamic light scattering method (Malvern Zetasizer Nano ZS)
* Slurry 3c = 2d = 1 g
* The pHs of the slurries are adjusted as appropriate using 3.5 g/L of acetic acid as necessary.

increases, the crystalline phase changes to tetragonal phase and cubic phase. It is believed that the Y-stabilized zirconia particle becomes harder as crystalline phase changes (from monoclinic to tetragonal to cubic) with increasing mol % of $Y_2O_3$, improving mechanical polishing rate. On the other hand, the replacement of $Zr^{4+}$ by $Y^{3+}$ will enhance chemical interaction between particles and carbon film in general. More specifically, it will create $O^{2-}$ vacancy in the particle and density of $O^{2-}$ vacancy will increase with mol % of $Y_2O_3$. It is hypothesized that $O^{2-}$ vacancy in the particle will enhance the oxidation of carbon film by $KMnO_4$, resulting in improvement in chemical polishing rate. Such enhance- Data in Table 9 were drafted in order to determine a possible effect of particle size on removal rate. A clear effect of particle size on removal rate is not observed in the range of 16-29 nm for Y-stabilized zirconia particle with 9.3 mol % $Y_2O_3$. Mechanically, larger particles typically produce higher mechanical polishing rate. Chemically, smaller particles usually enhance chemical polishing rate because of larger surface area that interact with surface of carbon film to be polished.

Example 10: Effect of pH

The following slurries were tested, and removal rate of amorphous carbon film was measured.

TABLE 10

| Slurry | Abrasive | Size (average secondary particle size) (nm) | Oxidizer | pH | RR (Å/minute) | pH adjusting agent |
|---|---|---|---|---|---|---|
| 4a | Y-stabilized zirconia (9.3 mol %) | 21 | Permanganate | 2.21 | 184 | Nitric acid |
| 4b | Y-stabilized zirconia (9.3 mol %) | 21 | Permanganate | 3.43 | 314 | 3.5 g/L of acetic acid |
| 4c | Y-stabilized zirconia (9.3 mol %) | 21 | Permanganate | 4.01 | 233 | 3.5 g/L of acetic acid and KOH |
| 4d | Y-stabilized zirconia (9.3 mol %) | 21 | Permanganate | 4.61 | 155 | 3.5 g/L of acetic acid and KOH |
| 4e | Y-stabilized zirconia (9.3 mol %) | 21 | Permanganate | 5.52 | 53 | 3.5 g/L of acetic acid and KOH |

\* The slurry production method (formulations) and the polishing conditions are the same as in Table 7 except:
\* Slurry 4a: The pH is adjusted to about 2.2 using nitric acid
\* Slurries 4c to 4e: The pHs are adjusted using 3.5 g/L of acetic acid and KOH.
\* Slurry 4b = 3c = 2d = 1 g
\* Particle sizes = Z-AVG measurement by dynamic light scattering method (Malvern Zetasizer Nano ZS)

Table 10 shows the effect of slurry pH on removal rate. The highest removal rate was obtained at a pH near 3.43 due to the use of acetic acid for adjustment of the pH of the slurry.

As a whole, pHs of about 2.2 to about 4.6 are a particularly useful pH range for producing high carbon removal rates for CMP use.

What is claimed is:

1. A method of manufacturing a polished polishing object, comprising polishing a polishing object comprising spin-on carbon (SoC) or diamond like carbon (DLC) using a chemical mechanical polishing (CMP) composition comprising an abrasive comprising zirconia particles and a metal-containing oxidizer and wherein an average primary particle size of the zirconia particles is about 3 to 110 nm, and an average secondary particle size of the zirconia particles is about 20 nm to about 2000 nm.

2. A method of manufacturing a polished polishing object, comprising polishing a polishing object comprising spin-on carbon (SoC) or diamond like carbon (DLC) using a chemical mechanical polishing (CMP) composition comprising an abrasive comprising zirconia particles and a metal-containing oxidizer and wherein the metal-containing oxidizer is present in an amount of about 0.05 mM or more with respect to the chemical mechanical polishing (CMP) composition.

3. A method of manufacturing a polished polishing object, comprising polishing a polishing object comprising spin-on carbon (SoC) or diamond like carbon (DLC) using a chemical mechanical polishing (CMP) composition comprising an abrasive comprising zirconia particles and a metal-containing oxidizer and wherein the zirconia particles comprise calcined zirconia.

4. A method of manufacturing a polished polishing object, comprising polishing a polishing object comprising spin-on carbon (SoC) or diamond like carbon (DLC) using a chemical mechanical polishing (CMP) composition comprising an abrasive comprising zirconia particles and a metal-containing oxidizer and wherein the zirconia particles are doped with yttria.

5. The method of claim 4, wherein the zirconia particles are doped with more than 9 mol % of yttria.

6. The method of claim 1, wherein the composition has a pH of about 2 to about 7.

7. The method of claim 1, wherein the zirconia particles are present in an amount of about 0.01 wt. % or more with respect to the chemical mechanical polishing (CMP) composition.

8. The method of claim 1, wherein the zirconia particles are present in an amount of about 4.0 wt. % or less with respect to the chemical mechanical polishing (CMP) composition.

9. The method of claim 1, wherein the zirconia particles comprise colloidal zirconia.

10. The method of claim 2, wherein the metal-containing oxidizer comprises an element selected from the group consisting of manganese, cerium, vanadium, and iron.

11. The method of claim 2, wherein the metal-containing oxidizer is selected from the group consisting of $KMnO_4$, $(NH_4)_2Ce(NO_3)_6$, $NaVO_3$, $NH_4VO_3$, and $Fe(NO_3)_3$.

12. The method of claim 2, wherein the composition has a pH of about 2 to about 7.

13. The method of claim 3, wherein the composition has a pH of about 2 to about 7.

14. The method of claim 3, wherein the zirconia particles are present in an amount of about 0.01 wt. % or more with respect to the chemical mechanical polishing (CMP) composition.

15. The method of claim 3, wherein the zirconia particles are present in an amount of about 4.0 wt. % or less with respect to the chemical mechanical polishing (CMP) composition.

16. The method of claim 4, wherein the composition has a pH of about 2 to about 7.

17. The method of claim 4, wherein the zirconia particles are present in an amount of about 0.01 wt. % or more with respect to the chemical mechanical polishing (CMP) composition.

18. The method of claim 4, wherein the zirconia particles are present in an amount of about 4.0 wt. % or less with respect to the chemical mechanical polishing (CMP) composition.

19. The method of claim 4, wherein the zirconia particles comprise colloidal zirconia.

\* \* \* \* \*